(12) United States Patent
Yiusing et al.

(10) Patent No.: US 7,730,604 B2
(45) Date of Patent: Jun. 8, 2010

(54) METHOD FOR ASSEMBLING A DISK DRIVE USING A SHIPPING COMB

(75) Inventors: Ho Yiusing, Hong Kong (CN); Canhua Chen, DongGuan (CN); Qinping Zhao, DongGuan (CN); Shenghe Yang, DongGuan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 12/314,976

(22) Filed: Dec. 19, 2008

(65) Prior Publication Data

US 2009/0119907 A1 May 14, 2009

Related U.S. Application Data

(62) Division of application No. 11/417,255, filed on May 4, 2006, now Pat. No. 7,487,582.

(51) Int. Cl.
*G11B 5/127* (2006.01)
*H04R 31/00* (2006.01)

(52) U.S. Cl. ............. 29/603.03; 29/603.04; 29/603.06; 29/603.07; 29/732; 29/737; 360/254.7; 360/254.8; 360/255.6; 360/255.7

(58) Field of Classification Search .............. 29/603.03, 29/603.04, 603.06, 732, 737; 360/254.7, 360/254.8, 255.6, 255.7
See application file for complete search history.

(56) References Cited

U.S. PATENT DOCUMENTS

| | | | | |
|---|---|---|---|---|
| 5,119,537 | A | * | 6/1992 | Hamanaka et al. ........ 29/603.03 |
| 5,465,476 | A | * | 11/1995 | Krajec et al. .................. 29/759 |
| 6,687,093 | B1 | | 2/2004 | Butler et al. ............. 360/265.7 |
| 2007/0185616 | A1 | | 8/2007 | Murray et al. .............. 700/245 |

* cited by examiner

*Primary Examiner*—Paul D Kim
(74) *Attorney, Agent, or Firm*—Nixon & Vanderhye P.C.

(57) ABSTRACT

A method for assembling a disk drive includes providing a head stack assembly (HSA), providing a shipping comb for assembling the disk drive, inserting a comb pin of the shipping comb into a locating holes in a HSA to assemble the shipping comb with the HSA together, positioning the HSA and shipping comb on a base cover of the disk drive, installing the HSA on the base cover via a bearing device thereof, rotating the assembled HSA and shipping comb to park the HSA on the ramp and aligning the comb pin with the securing hole, pushing the comb pin into a securing hole to lock the HSA in the base cover, assembling a latch device and a top voice coil magnet on the base cover, and rotating out the shipping comb to a position where the shipping comb is not interfered with the disk drive.

8 Claims, 19 Drawing Sheets

METHOD FOR ASSEMBLING A DISK DRIVE USING A SHIPPING COMB

CROSS-REFERENCE TO RELATED APPLICATIONS

This is a division of application Ser. No. 11/417,255, filed on May 4, 2006, now U.S. Pat. No. 7,487,582, the entire contents of which are hereby incorporated herein by reference.

FIELD OF THE INVENTION

The present invention relates to a method for assembling a head stack assembly (HSA) in a disk drive using a shipping comb.

BACKGROUND OF THE INVENTION

Disk drives are information storage devices that use magnetic media to store data. Referring to FIG. 1A, a typical disk drive 2 comprises a set of circular and concentric disks 201. Each disk 201 has a surface on which a magnetic coating is provided for forming a plurality of concentric tracks. The disks 201 are mounted on a spindle motor 202 that selectively spins the disks 201. A plurality of vertically-aligned sliders 203 incorporating read/write head therein (only one head is shown) are controllably carried and positioned by a HSA 200. A voice coil motor (VCM, not shown) rotates the HSA 200 to cause the sliders 203 to move across the surfaces of the disks 201 from track to track for reading data from or writing data to the disks 201. Both the spindle motor 202 and the HSA 200 are mounted to and supported by a base cover 205 of the disk drive 2. When in operation, a lift force is generated by the aerodynamic interaction between the slider 203 and the spinning disk 201. The lift force is opposed by equal and opposite spring forces applied by the HSA 200 such that a predetermined flying height above the surface of the spinning disk 201 is maintained over a full radial stroke of the HSA 200. The HSA 200 also comprises a ramp structure 230 to park the sliders 203 when the disk drive is not in operation.

FIG. 1B shows a detailed structure of the HSA of FIG. 1A. As illustrated, the HSA 200 comprises a set of drive arms 204 at one end thereof, wherein each drive arm 204 has a head gimbal assembly (HGA) 220 incorporating the slider 203 mounted on distal end of the drive arm 204. The drive arm 204 also has a locating hole 222 formed thereon for locating a shipping comb (not shown) used in process of mounting a HSA to the disk drive. The HSA 200 also comprises a fantail spacer 219 incorporating a voice coil 207 at the other end thereof, and the drive arms 204 are connected to the fantail spacer 219 by a bearing device 212. One end of a flexible printed circuit (FPC) 206 is electrically connected to the HSA 200, and the other end of the FPC 206 is electrically connected to a printed circuit board (PCB) 208. This electrical connection enables an external control system to control the HSA 200.

As illustrated above, in structure of a HSA, for maintaining a proper spring force that balances an equal and opposite lift force generated by aerodynamic interaction between the slider and the spinning disk, the distal end of each HGA is slightly downwards bended in manufacturing process of the HSA to produce a predefined spring force. More concretely, the distance between adjacent sliders mounted to respective HGAs is smaller than thickness of the disk. As a result, when assembling a head stack assembly to a disk drive, a special mounting tool, i.e., a comb-shaped shipping comb is used to facilitate the mounting process. More specifically, in HSA mounting process, the shipping comb is inserted into space formed between adjacent HGAs to enlarge the distance between the adjacent sliders, such that the disk can be accommodated in the space without interference with the sliders, thus no damage to the sliders and/or disks being happened.

Furthermore, when the disk drive with a ramp design is not in operation, the HSA moves its sliders away from above the disk surfaces until the sliders come to park on the ramp. The ramp is structured to park the set of sliders thereon and functions similarly as the shipping comb to separate adjacent sliders away from each other. During the disk drive operations, the HSA moves the sliders away from the ramp and then moves the sliders towards the disk surfaces, thereby positioning the respective sliders to a position above the respective disk surfaces.

Therefore, it is necessary to rotate the HSA to and park it on the ramp in HSA assembling process, such that when the assembly process is completed and the disk drive is operated, the sliders can be moved away from the ramp and located above the spinning disk surfaces. Conventionally, in HSA assembling process, parking the sliders onto the ramp is realized by utilization of the shipping comb abovementioned and this will be described below in conjunction with FIGS. 1A-1B and FIG. 2.

Now referring to FIGS. 1A-1B and FIG. 2, a conventional shipping comb 100 is of an integral structure, which comprises a comb finger 170 to separate two adjacent sliders 203 of a HSA 200 and an unmovable comb pin 120. Before the HSA 200 is mounted to the disk drive 2, the shipping comb 100 is secured to the HSA 200 by inserting its comb pin 120 into the locating hole 222 of the HSA 200. Then the bearing device 212 of the HSA 200 is pivotally mounted to the base cover 205 of the disk drive 2, and the sliders 203 of the HSA 200 are rotated towards the ramp 230, so that the sliders 203 can be parked thereto. After parking of the sliders 203 onto the ramp 230, other components for example top voice coil magnet (such as the top voice coil magnet 550 shown in FIG. 12A) and latch device (such as the latch device 540 shown in FIG. 12A) used to limit the position of the HSA, may be assembled to the disk drive.

In assembly process of above components, because of shaking or jolting inside the disk drive and the HSA mounted to the base cover of the disk drive rotating around the bearing device, consequently, the sliders parked on the ramp may slide away therefrom and collide with other part of the disk drive, for example, the sliders may impact the inner side wall of the disk drive, or the adjacent sliders collide each other, thus causing damage to the sliders. Therefore, in assembly process of the components such as the top voice coil magnet and the latch device, the HSA should be maintained stationary all the time by suitable manner until the components are mounted into the disk drive completely, as the top voice coil magnet and the latch device mounted into the disk drive are able to control position of the HSA and respective sliders with respect to the ramp.

However, since the conventional shipping comb described above has a comb pin that is position-fixed relative to the rest of the shipping comb, namely, the comb pin can be inserted only into the locating hole of the HSA, not both the HSA and the base cover of the disk drive, as a result, the shipping comb is unable to provide a function of holding the sliders of the HSA on the ramp during assembly process of other components. Therefore, various methods/devices are used in above assembly process to temporarily hold the HSA on the ramp.

One method commonly used is by forming a plurality of concave detents on the ramp. When parked on the ramp, the sliders are actually parked at these concave detents and these detents hold the sliders therein. However, due to dimension limitation of the ramp, the detents can not be formed sufficiently large, a slightly larger vibration will cause the sliders moving away from the detents of the ramp and making the HSA rotating freely around its bearing device, thus easily leading to slider damage or interference of the HSA with other components disposed in the disk drive.

Another method is using an additional locking mechanism to hole the HSA on its position. For example, a locating pilot may be inserted into both a locating hole and a respective hole formed on the base cover of the disk drive to temporarily secure the HSA on the base cover during process of assembling other components to the disk drive. However, this additionally provided locking device is time-consuming and difficult to be taken out after completing the whole assembly process. Moreover, this locking device is also difficult to be incorporated in an automatic assembly process of the HSA. Furthermore, providing this additional locking device increases manufacture cost.

Thus, it is desired to provide an apparatus and a method for easily assembling the HSA on the disk drive and simplifying its assembly process.

SUMMARY OF THE INVENTION

One aspect of the invention is to provide a shipping comb for assembling a disk drive and a method for assembling the disk drive using the shipping comb, which can safely hold the sliders to the ramp of the disk drive during assembling process.

Another aspect of the invention is to provide a shipping comb for assembling a disk drive and a method for assembling the disk drive using the shipping comb, which can greatly simplifying manufacture process of the disk drive and improve manufacture efficiency.

Yet another aspect of the invention is to provide a shipping comb for assembling a disk drive and a method for assembling the disk drive using the shipping comb, which can significantly, reduces manufacture cost.

To achieve the above-mentioned objectives, a shipping comb for assembling a disk drive comprises: a comb block, wherein the comb block comprises a locking portion having a comb pin hole forming therein, at least one spacer and a connecting beam to connect the locking portion and the at least one spacer; a comb pin received in the comb pin hole of the locking portion; and a controlling system to engage with and control the comb pin to move in the comb pin hole.

In one embodiment of the invention, the controlling system comprises a comb latch having a latch member and a first limiter formed thereon, a second limiter provided on the locking portion, and a resilient member disposed between and compressed by the first limiter and the second limiter; wherein the comb pin comprises two engaging grooves which are selectively engaged with the latch member of the comb latch. The locking portion further comprises a carrier plate, and the second limiter of the controlling system is provided on the carrier plate.

In an embodiment of the invention, the comb latch further comprises a pair of pivot posts; the locking portion further comprises two support plates, each support plate having a notch, the pivot posts being received in the notches respectively. The latch member of the comb latch is contained in a space defined between the two support plates. In an embodiment of the invention, the resilient member may be a spring.

The comb pin may have a leading portion formed on its distal end to easily guide the comb pin into the comb pin hole of the locking portion.

In the invention, a method for assembling a disk drive having a ramp, comprises the steps of: providing a head stack assembly (HSA) having a plurality of drive arms each of which has a locating hole therein, and a base cover for mounting the HSA therein which has a securing hole formed therein; providing an above-described shipping comb; inserting the comb pin of the shipping comb into the locating holes in the HSA to assemble the shipping comb with the HSA together; positioning the assembled HSA and shipping comb on the base cover of the disk drive; installing the HSA on the base cover via a bearing device thereof; rotating the assembled HSA and shipping comb to park the HSA on the ramp and aligning the comb pin with the securing hole; pushing the comb pin into the securing hole to lock the HSA in the base cover; assembling a latch device and a top voice coil magnet on the base cover; rotating the shipping comb to a position where the shipping comb is not interfered with the disk drive; and pulling out the shipping comb from the HSA.

The present invention will become more obvious from the following description when taken in connection with the accompanying drawings, which show, for purposes of illustration only, preferred embodiments in accordance with the present invention. In the drawings:

DETAILED DESCRIPTION OF THE PREFERRED EMBODIMENTS

Figure 1A:
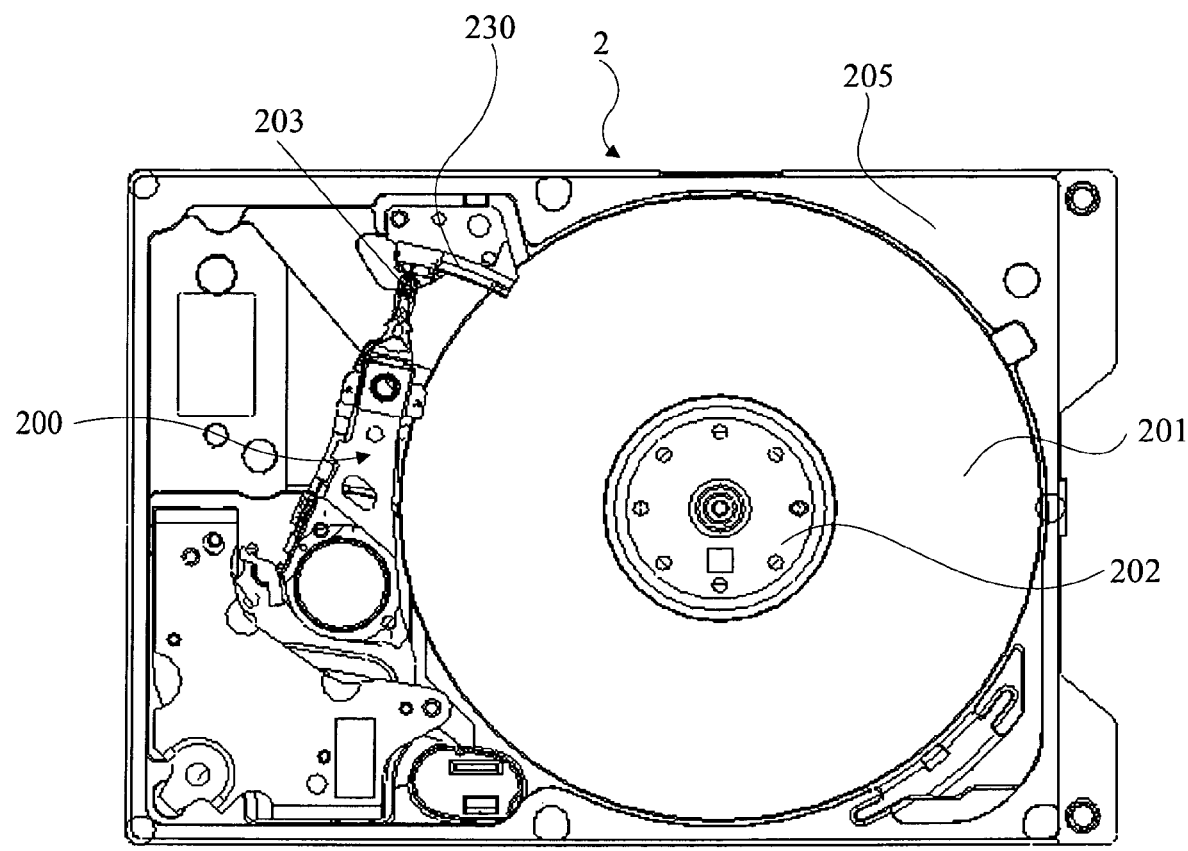
FIG. 1A shows a top plan view of a conventional disk drive.
Figure 1B:
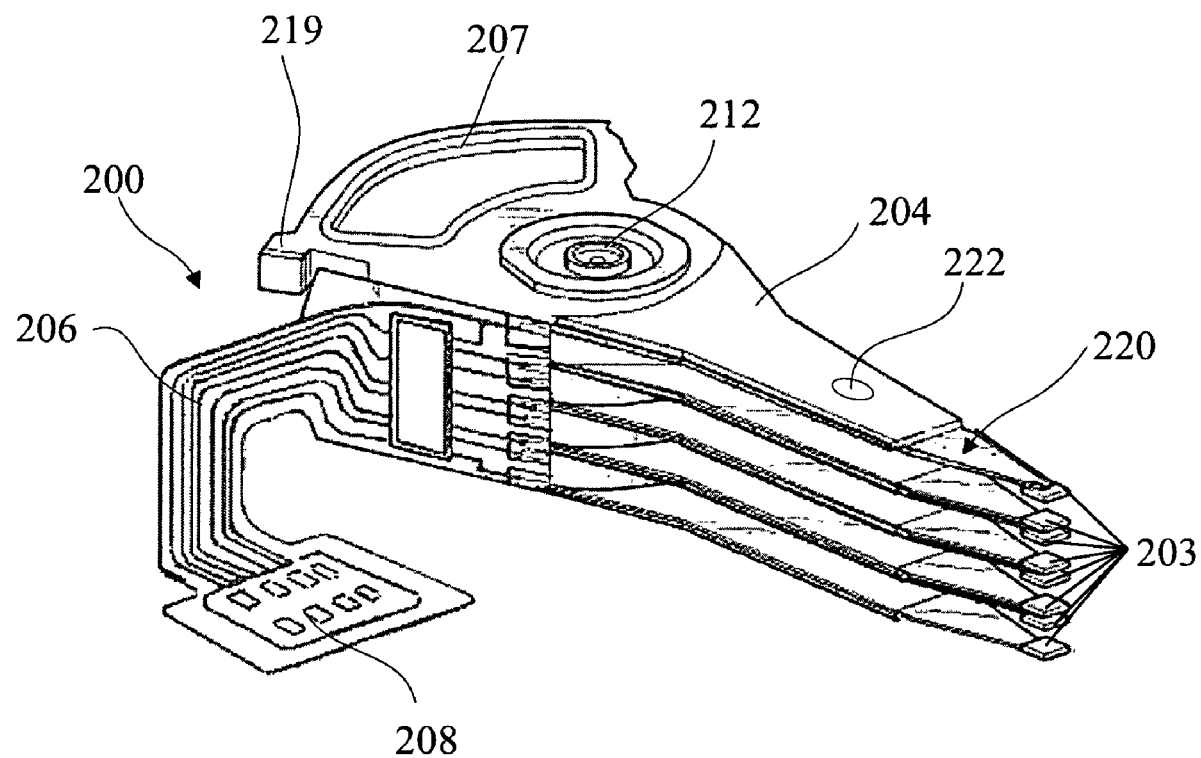
FIG. 1B shows a perspective view of a HSA shown in FIG. 1A.
Figure 2:
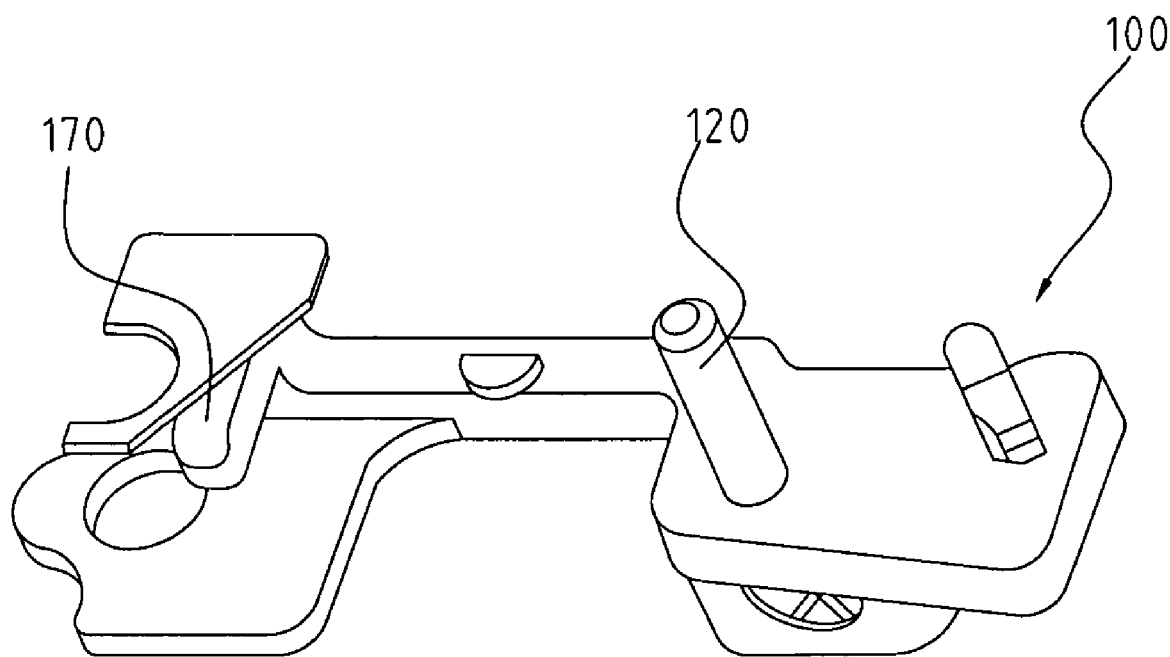
FIG. 2 shows a perspective view of a conventional shipping comb used in disk drive assembly process.
Figure 3:
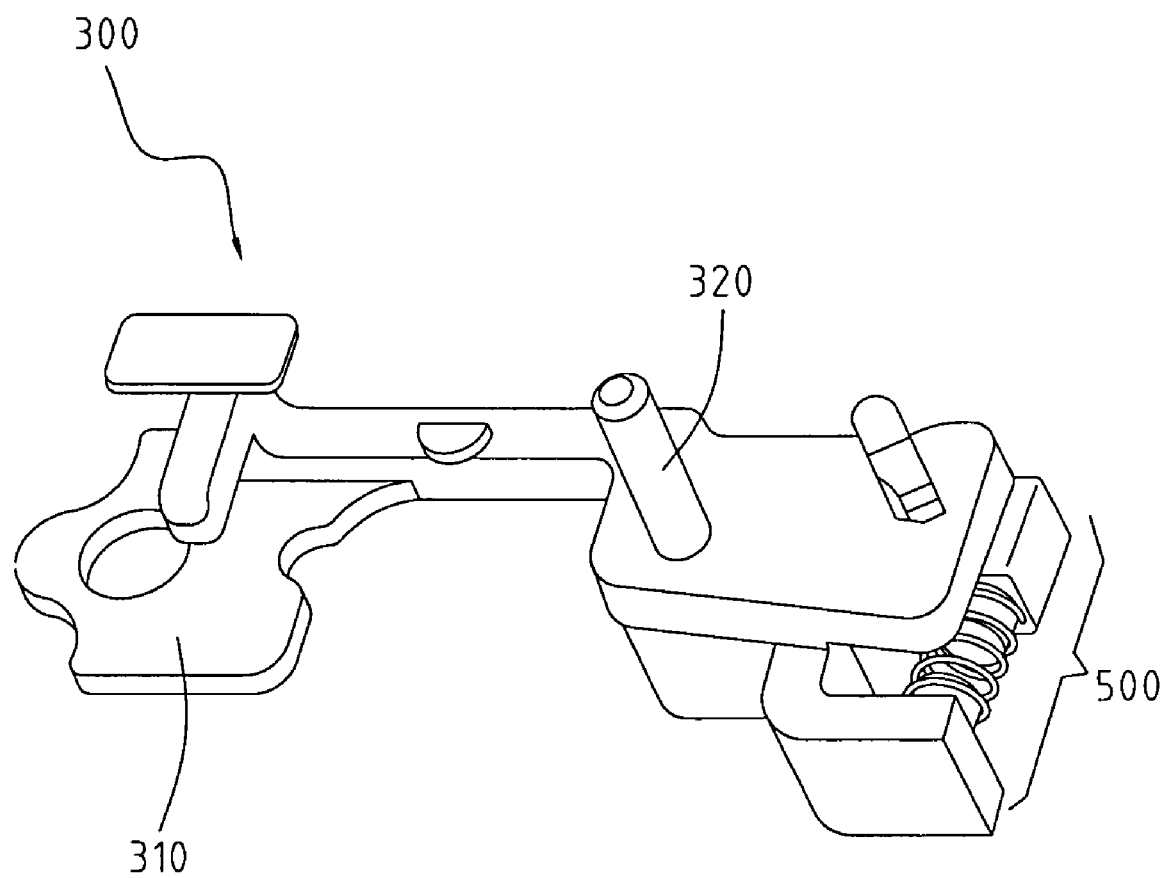
FIG. 3 shows a perspective view of a shipping comb in accordance with one embodiment of the present invention.

Various embodiments of a shipping comb and method for assembling a disk drive using the shipping comb of the invention will now be described in detail in conjunction with the drawings. As illustrated, the invention provides a shipping comb for assembling a disk drive, which comprises: a comb block, wherein the comb block comprises a locking portion having a comb pin hole forming therein, at least one spacer and a connecting beam to connect the locking portion and the at least one spacer; a comb pin received in the comb pin hole of the locking portion; and a controlling system to engage with and control the comb pin to move in the comb pin hole. By movably mounting a comb pin in the comb pin hole, the comb pin can be selectively moved from a first position where the comb pin is completely contained in locating holes of a head stack assembly (HSA), to a second position where the comb pin is partially extended from bottom of the HSA and inserted into a securing hole of a base cover of a disk drive, such that the HSA can be temporarily secured to the base cover of the disk drive with sliders of the HSA being parked on a ramp provided on the disk drive, during disk drive assembling process, thus no additional locking mechanism is needed in temporary lock of the HSA, accordingly, manufacture process being simplified, manufacture efficiency being improved and manufacture cost being decreased.

FIGS. 3-7 and FIGS. 8A-8B illustrate a shipping comb according to one embodiment of the invention. The shipping comb 300 comprises a comb block 310 having a comb pin hole 366, a comb pin 320 received in the comb pin hole 366, a controlling system 500 to engage with and control the comb pin 320 to move in the comb pin hole 366.

Figure 4:
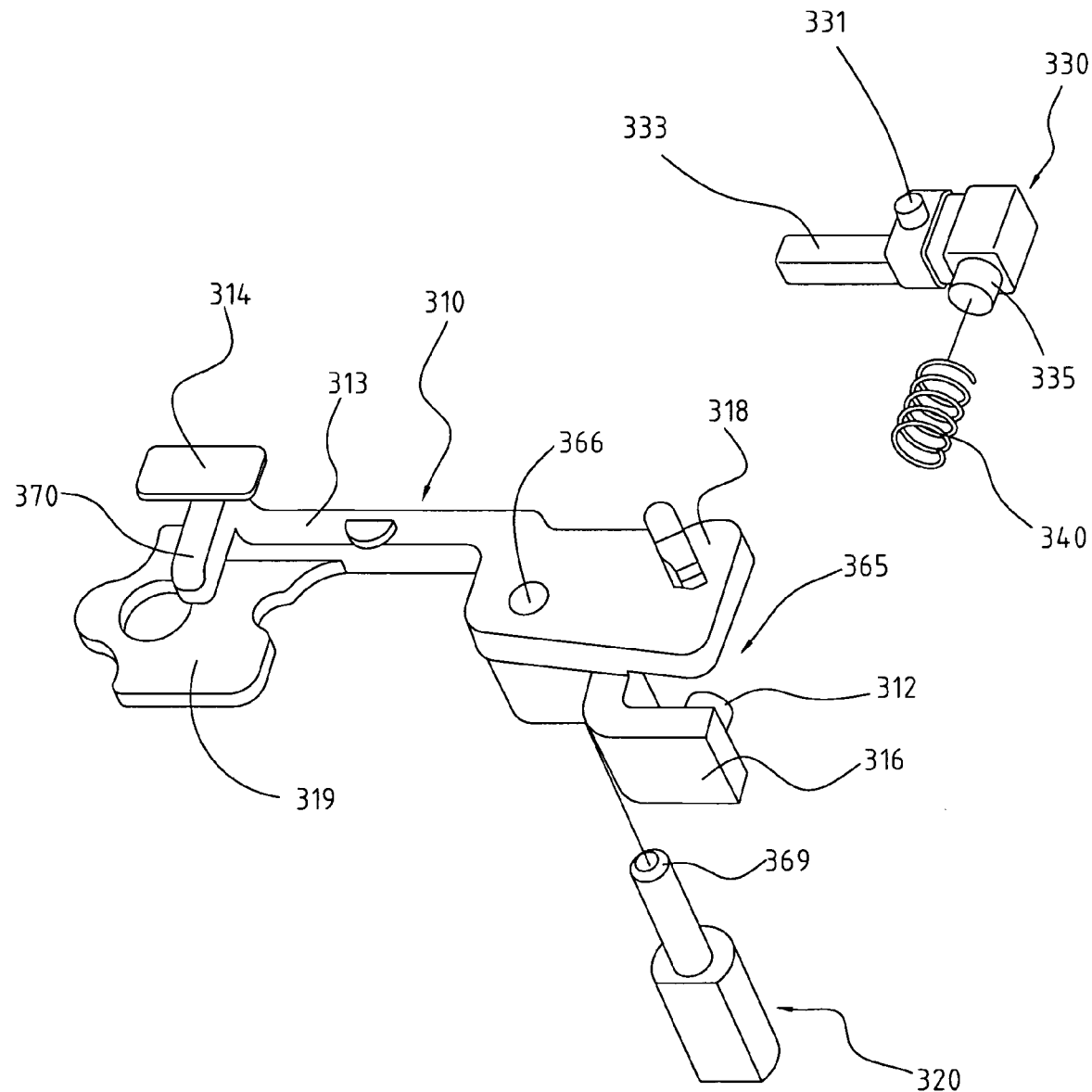
FIG. 4 shows an exploded, perspective view of the shipping comb of FIG. 3.
Figure 5:
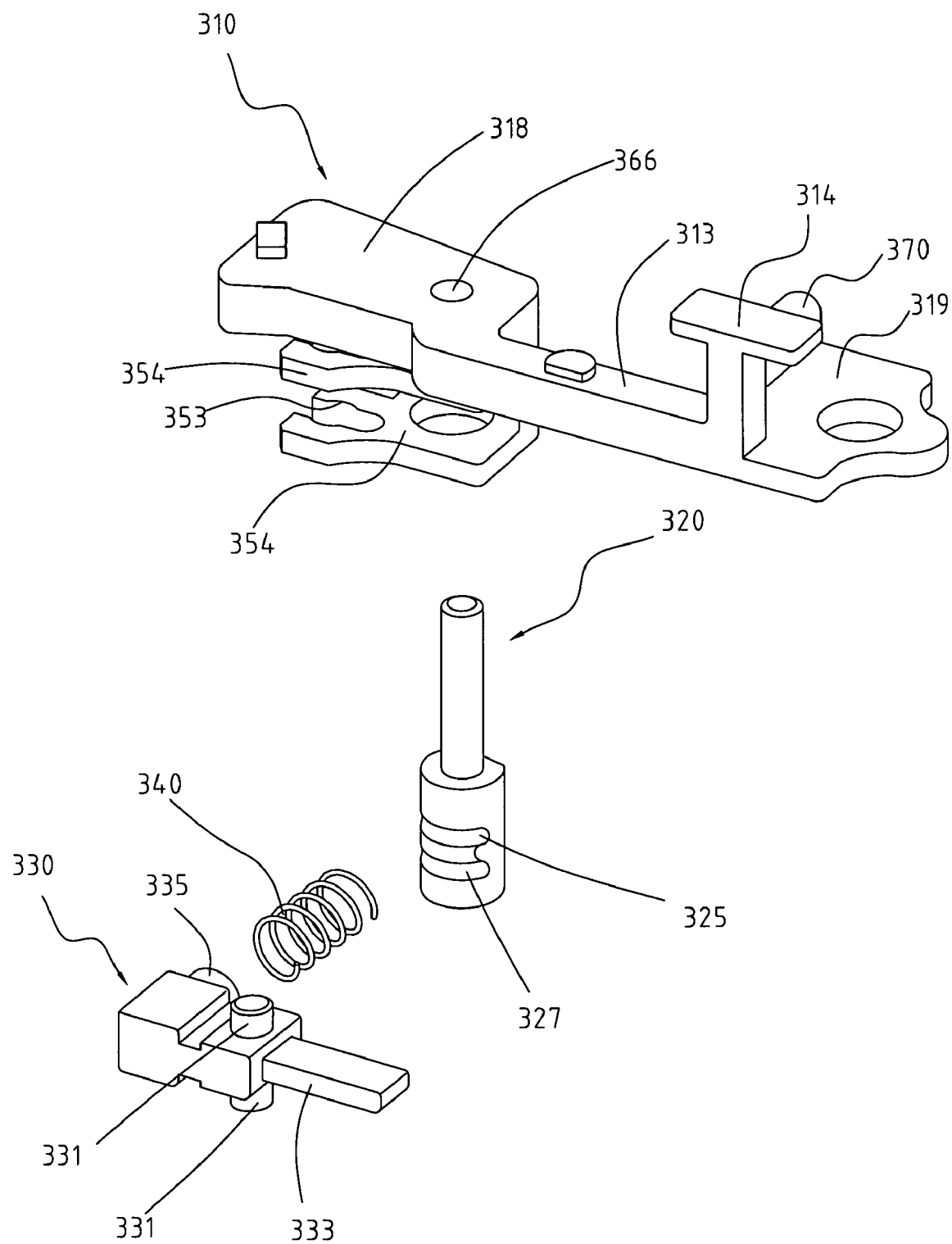
FIG. 5 shows an exploded, perspective view of the shipping comb of FIG. 3 while viewed from a different direction.

Referring to FIGS. 4-5, the comb block 310 comprises: a locking portion 365 having a comb pin hole 366 forming therein; at least one spacer 370 to separate sliders of a HSA (not shown); and a connecting beam 313 to connect the locking portion 365 and the at least one spacer 370.

The controlling system 500 comprises a comb latch 330 having a latch member 333 and a first limiter 335 formed thereon, a second limiter 312 provided on the locking portion 365, and a resilient member 340 disposed between and compressed by the first limiter 335 and the second limiter 312. The comb pin 320 comprises two engaging grooves 325, 327 which are selectively engaged with the latch member 333 of the comb latch 330. Preferably, the resilient member 340 is a spring.

As shown in FIGS. 4-5, the locking portion 365 may further comprise a carrier plate 316. The second limiter 312 of the controlling system 500 is provided on the carrier plate 316.

The comb latch 330 may further comprise a pair of pivot posts 331. The locking portion 365 may further comprise two support plates 354, each support plate 354 having a notch 353, and the pivot posts 331 being received in the notches 353 respectively. The latch member 333 of the comb latch 330 is contained in a space defined between the two support plates 354.

In an embodiment of the invention, the comb pin 320 may have a leading portion 369 formed on its distal end to easily guide the comb pin 320 into the comb pin hole 366 of the locking portion 365.

Figure 6:
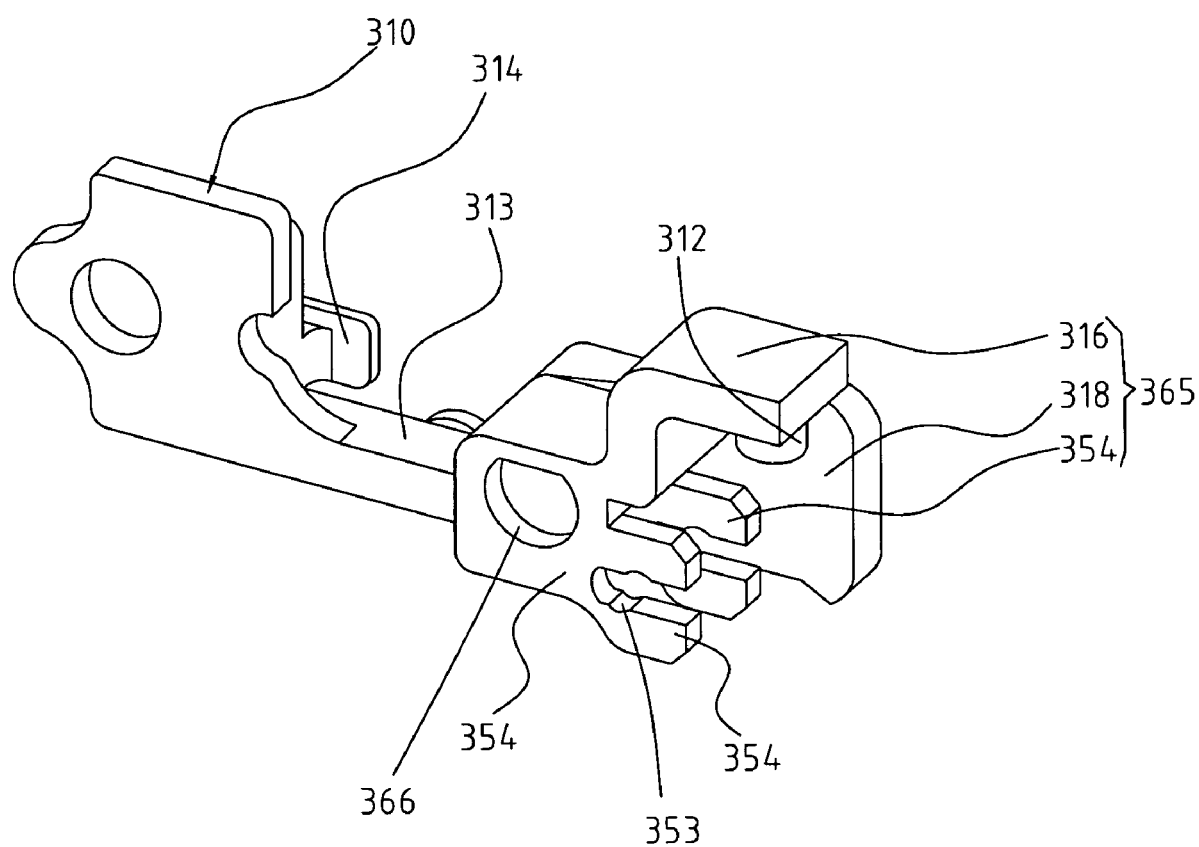
FIG. 6 shows a perspective view of a comb block according to one embodiment of the invention.
Figure 7:
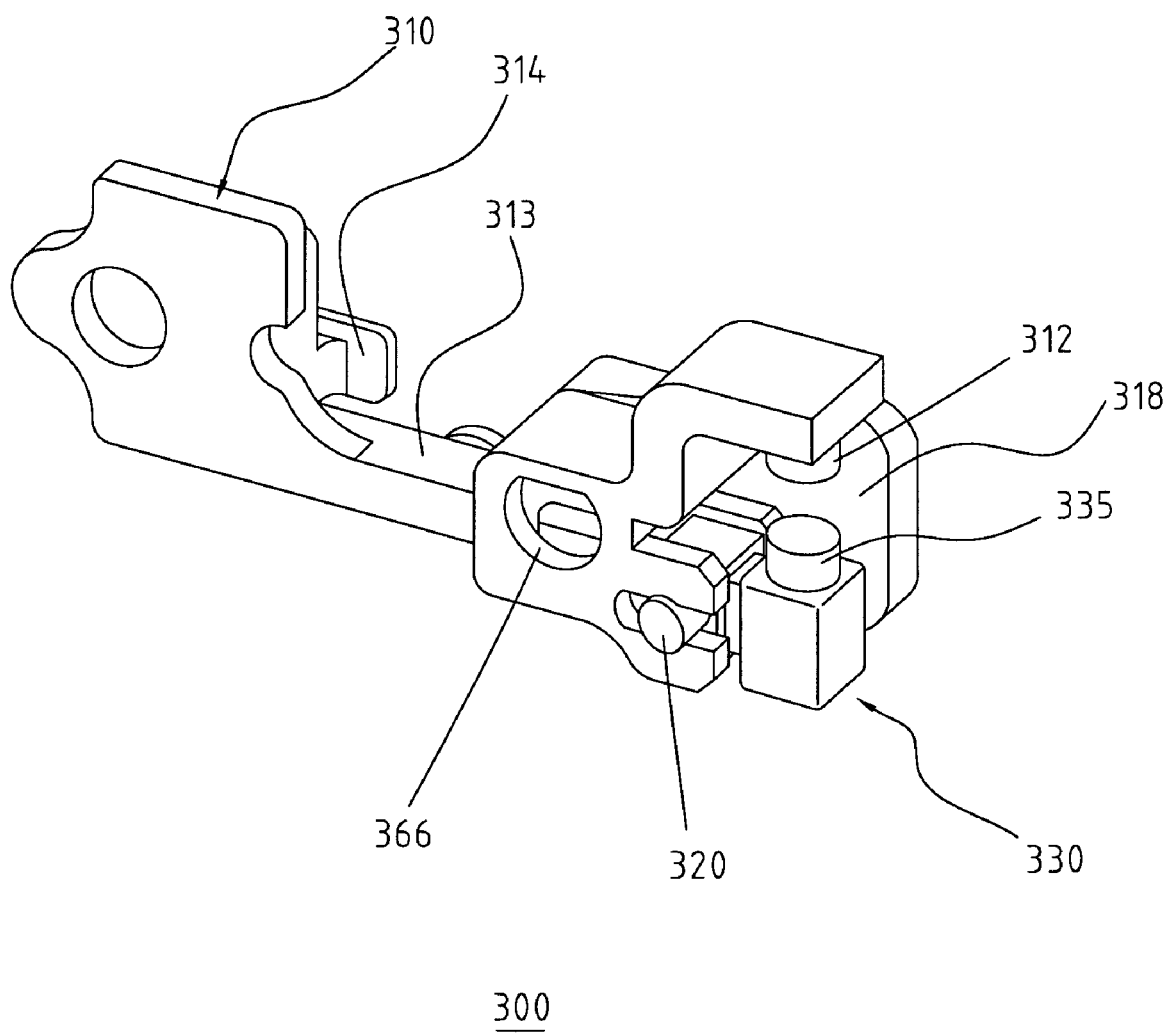
FIG. 7 shows a perspective view of the shipping comb of FIG. 3 viewed from another direction and with the spring and comb pin removed.

Referring to FIG. 6, the locking portion 365 may also comprise a mounting plate 318 against which the shipping comb 300 can be mounted onto a surface of a HSA. In another embodiment of the invention, as shown in FIG. 4, the comb block 310 may also have a top shield 314 and a bottom shield 319 parallel to the top shield 314 to protect sliders when the shipping comb 300 is mounted to the HSA.

Figure 8:
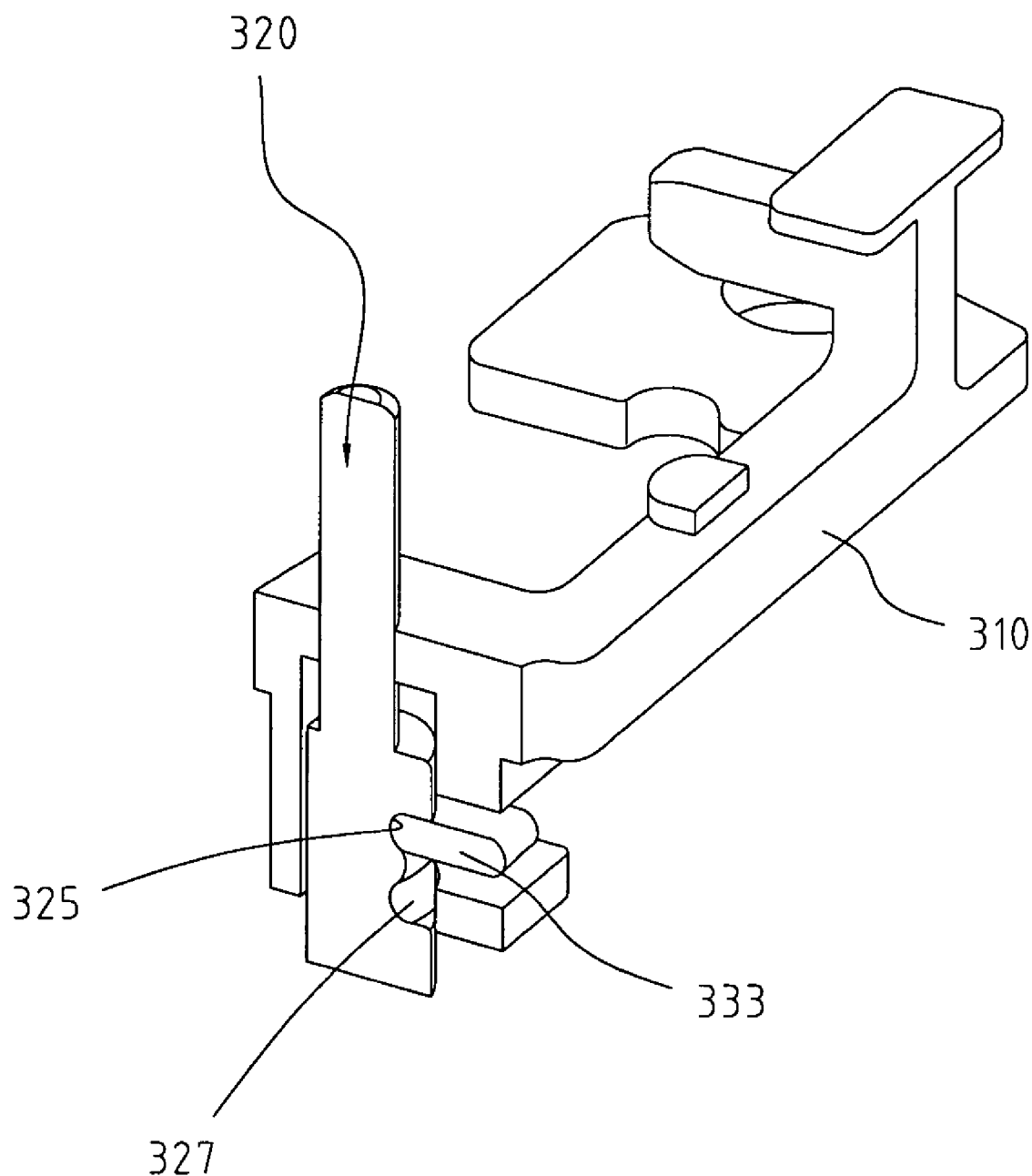
FIG. 8 is a perspective view of the shipping comb of FIG. 3 with some components cut away for illustrating a comb pin positioned in a first lock position.
Figure 9:
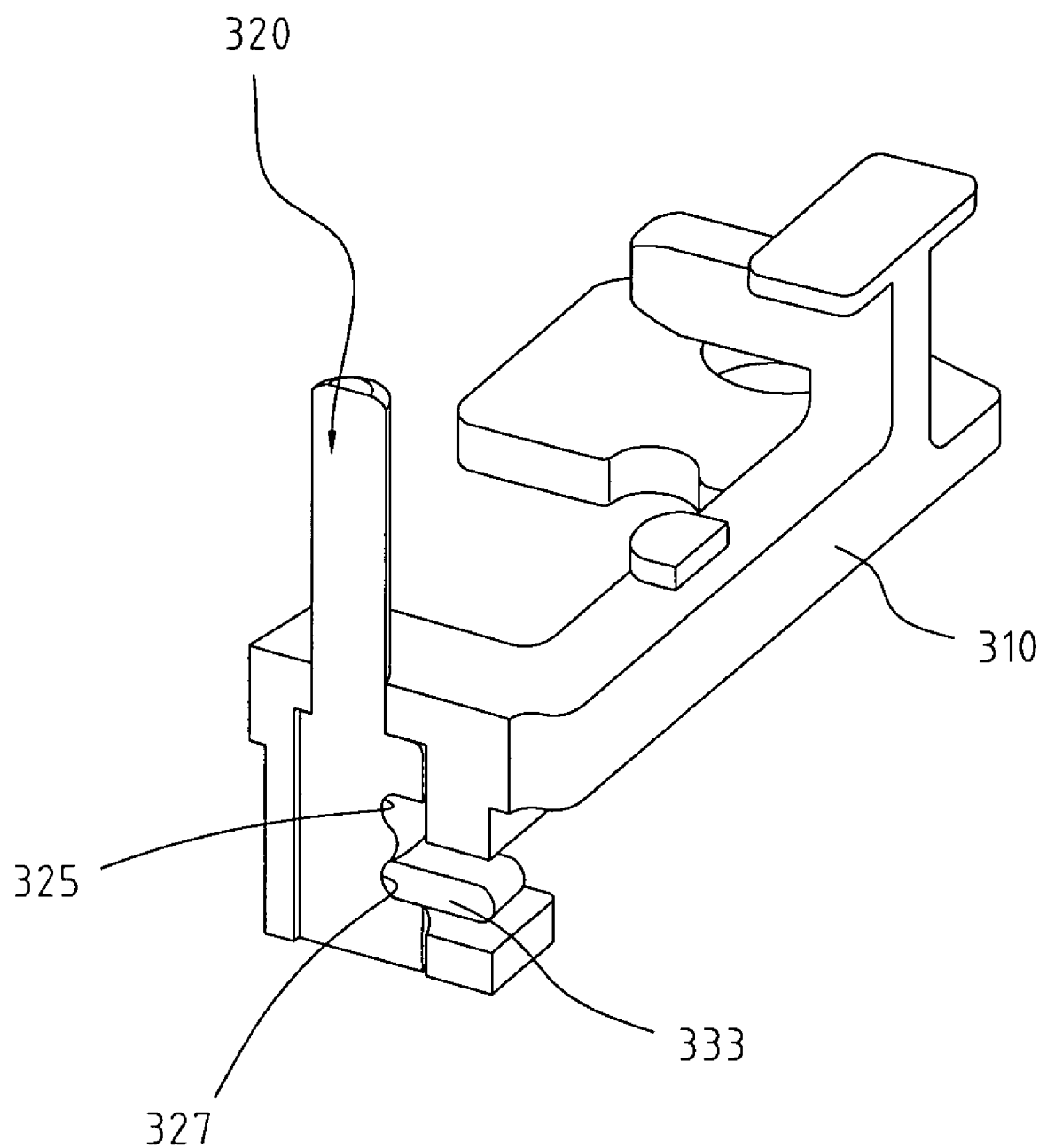
FIG. 9 is a perspective view of the shipping comb of FIG. 3 with some components cut away for illustrating a comb pin positioned in a second lock position.

Now referring to FIG. 8, the latch member 333 is engaged with an engaging groove 325 of the comb pin 320. By pushing the comb pin 320, as shown in FIG. 9, the latch member 333 can be engaged with the other engaging groove 327.

In the embodiment, a spring 340 (as shown in FIG. 5) is used to provide force that makes the engagement of the recesses 325,327 and the comb latch 330, however, any suitable member that provides spring force may also be used to replace the spring, for example, a resilient rubber member may be used.

Figure 13:
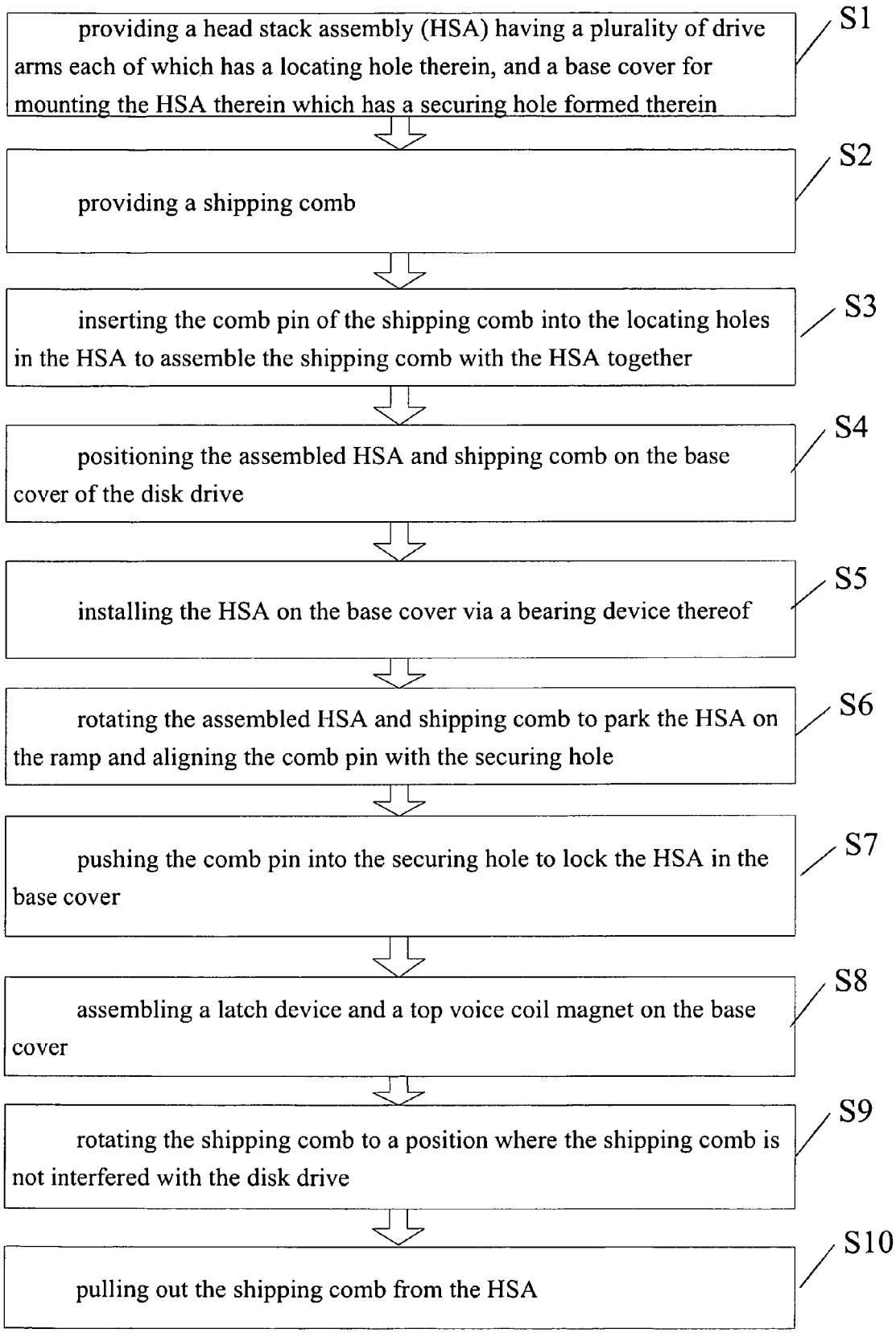
FIG. 13 shows a flowchart illustrating a method for assembling a HSA into the disk drive according to one embodiment of the invention.

The invention also discloses a method for assembling a disk drive using the shipping comb of the invention. As illustrated in FIG. 13, the method comprises steps of: providing a head stack assembly (HSA) having a plurality of drive arms each of which has a locating hole therein, and a base cover for mounting the HSA therein which has a securing hole formed therein (step S1); providing a shipping comb 300 as described above (step S2); inserting the comb pin of the shipping comb into the locating holes in the HSA to assemble the shipping comb with the HSA together (step S3); positioning the assembled HSA and shipping comb on the base cover of the disk drive (step S4); installing the HSA on the base cover via a bearing device thereof (step S5); rotating the assembled HSA and shipping comb to park the HSA on the ramp and aligning the comb pin with the securing hole (step S6); pushing the comb pin into the securing hole to lock the HSA in the base cover (step S7); assembling a latch device and a top voice coil magnet on the base cover (step S8); rotating the shipping comb to a position where the shipping comb is not interfered with the disk drive (step S9); and pulling out the shipping comb from the HSA (step S10).

In an embodiment of the invention, forming the controlling system of the shipping comb comprises forming a comb latch which has a latch member and a first limiter, a second limiter on the locking portion, and a resilient member. Forming the comb pin comprises forming two engaging grooves for selectively engaging with the latch member of the comb latch.

In another embodiment, forming the locking portion further comprises forming a carrier plate to load the second limiter. Forming the comb latch further comprises forming a pair of pivot posts; and forming the locking portion further comprises forming two support plates each of which having a notch to receive the corresponding pivot post. In another embodiment, forming the comb pin comprises forming a leading portion on a distal thereof end for easily guiding the comb pin into the comb pin hole of the locking portion.

Figure 10A:
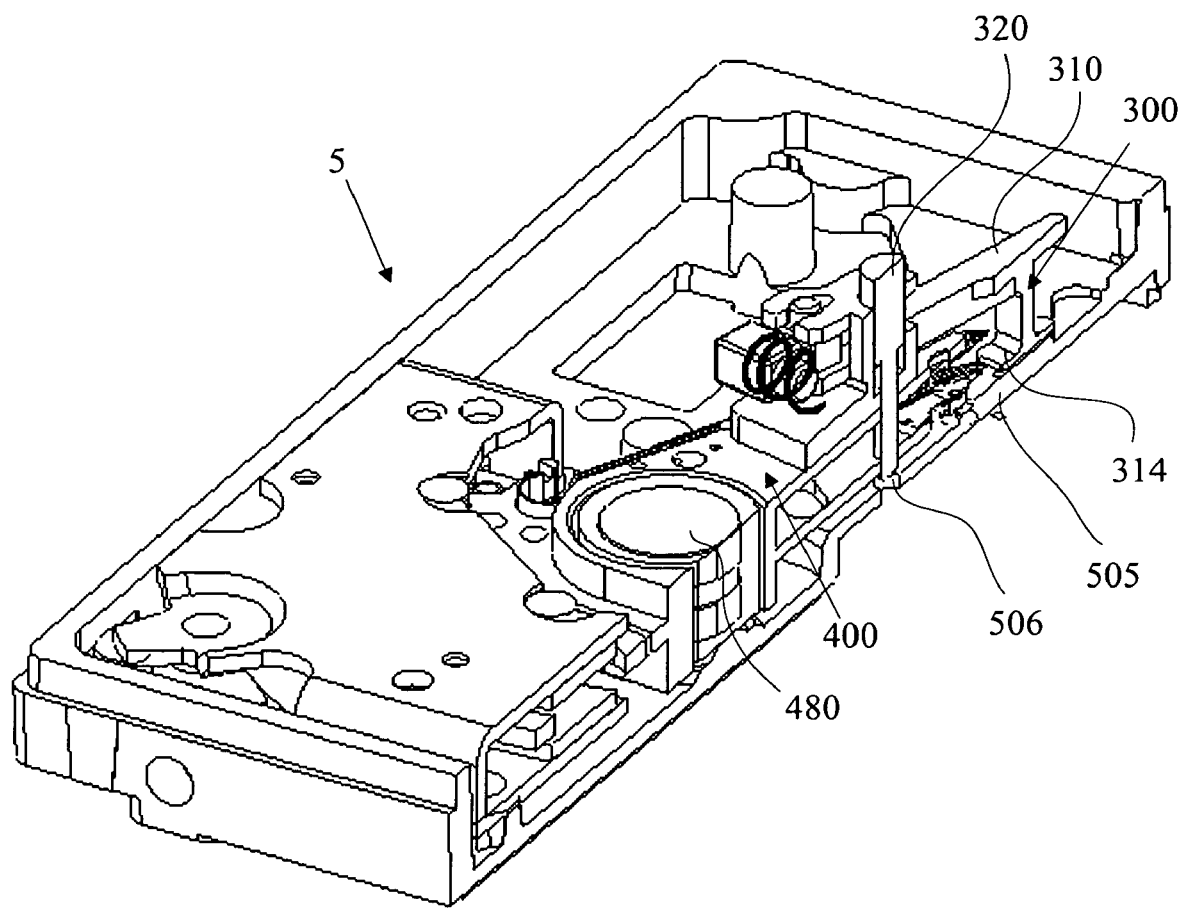
FIG. 10A shows a perspective view of a disk drive with some part cut away, illustrating a shipping comb mounted therein and the comb pin of the shipping comb being positioned in a first lock position according to one embodiment of the invention.
Figure 10B:
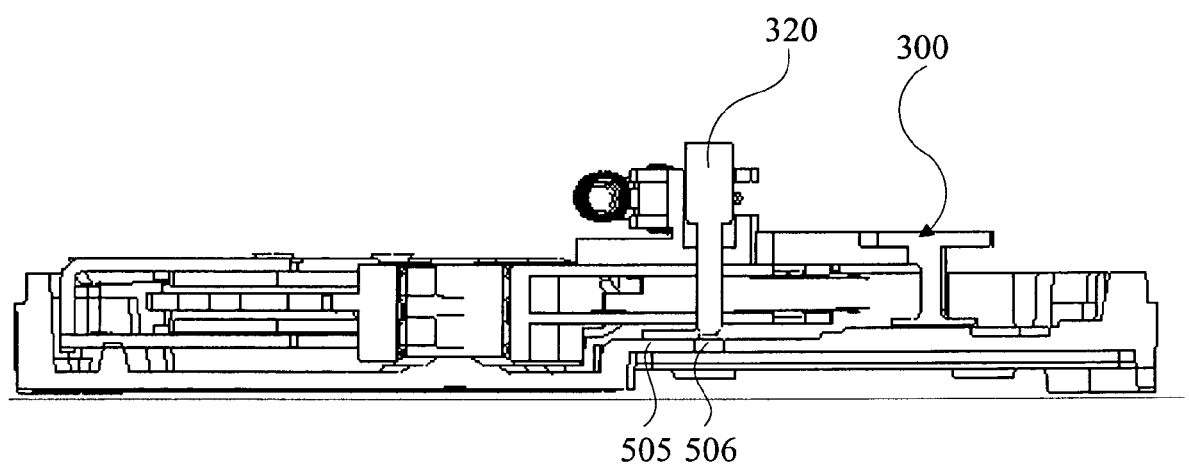
FIG. 10B shows a cross-sectional view of the disk drive of FIG. 10A.
Figure 10C:
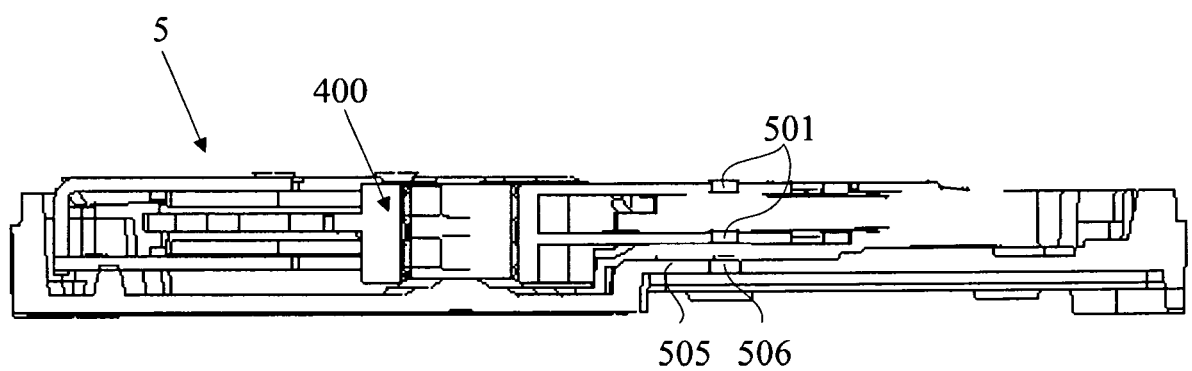
FIG. 10C shows a cross-sectional view of the disk drive of FIG. 10A with the shipping comb removed away to illustrate the locating holes formed on the HSA and respective locking hole formed on the base cover of the disk drive.

FIGS. 10A-10C show a shipping comb 300 mounted on a HSA 400 (step S5). The shipping comb 300 is mounted onto the HSA 400 by inserting its comb pin 320 into a plurality of locating holes 501 of the HSA 400. The bearing device 480 of the HSA 400 is mounted to the base cover 505 of a disk drive 5. A comb pin 320 is aligned vertically with the securing hole 506 of the base cover 505 but not inserted into the securing hole 506.

Figure 11A:
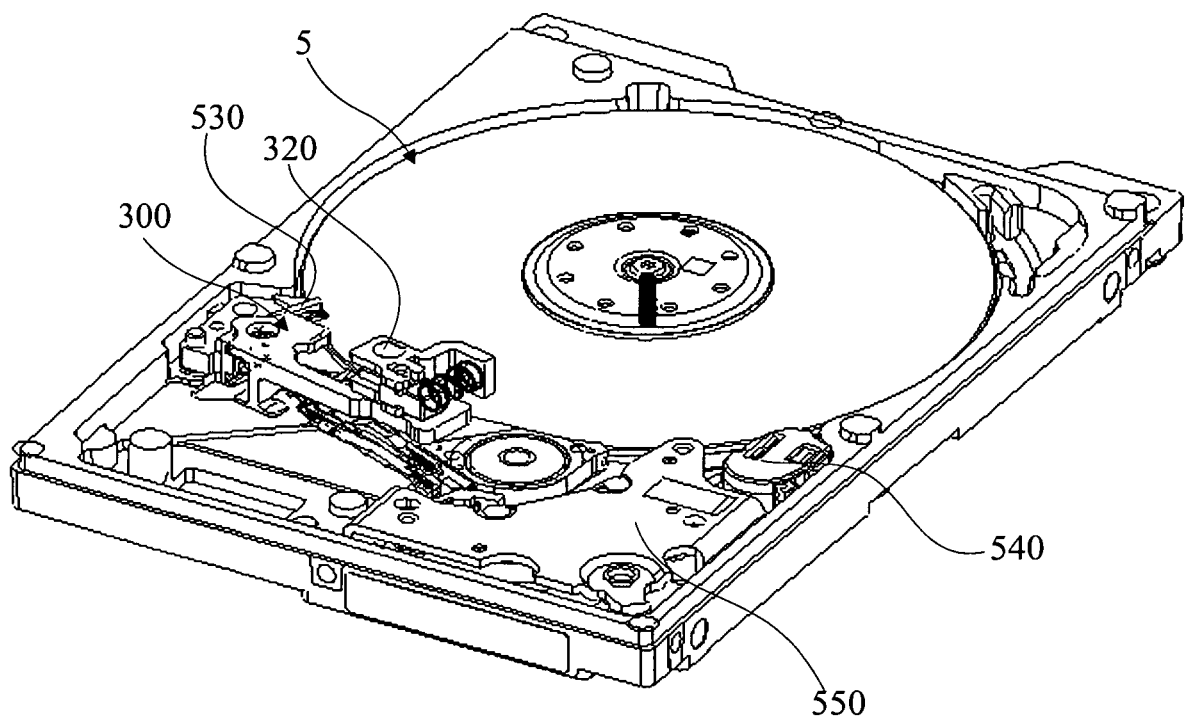
FIG. 11A shows a perspective view of the disk drive of FIG. 10A with the comb pin of the shipping comb located in the second position and the HSA being secured temporarily to the base cover of the disk drive.
Figure 11B:
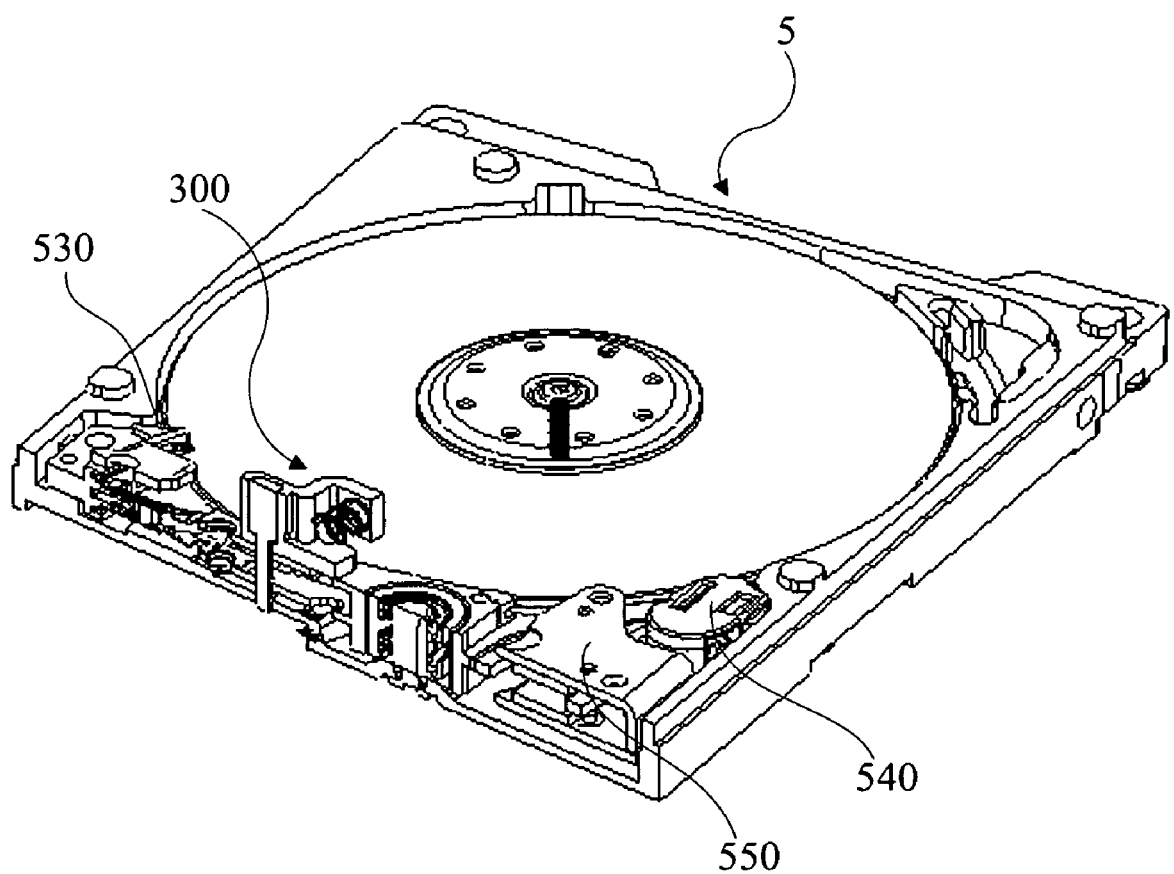
FIG. 11B shows a perspective view of the disk drive of FIG. 11A with part cut away to clearly show spatial relationship between the shipping comb, the HSA and the base cover of the disk drive.
Figure 11C:
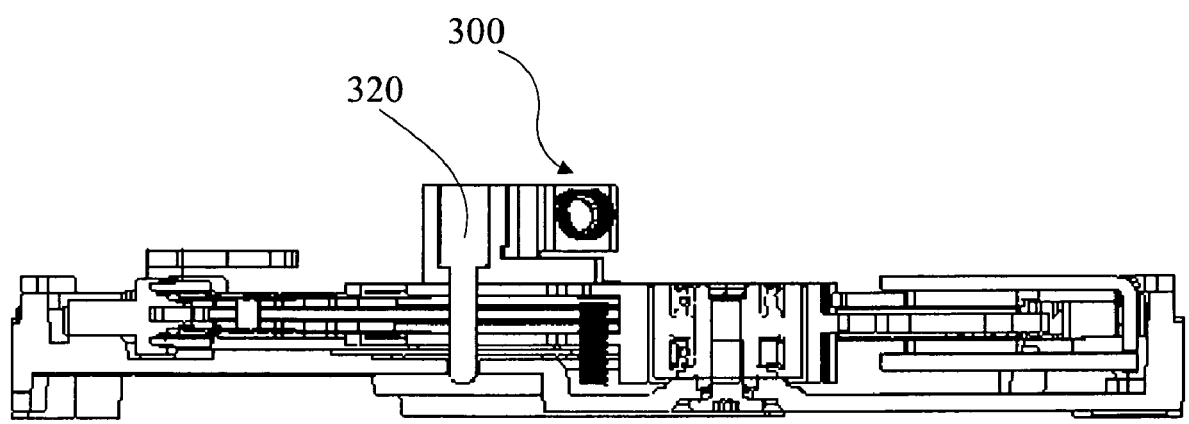
FIG. 11C shows a cross-sectional view of the disk drive of FIG. 11A.

FIGS. 11A-11C show different views of the disk drive 5 when the comb pin 320 of the shipping comb 300 is completely inserted into the securing hole 506 of the base cover 505 (step S7). In this state, sliders (not shown) of the HSA is positioned on the ramp 530, and the HSA is stably secured to the base cover. Thereafter, other components such as a top voice coil magnet 550 and a latch device 540 is mounted into the disk drive 5.

Figure 12A:
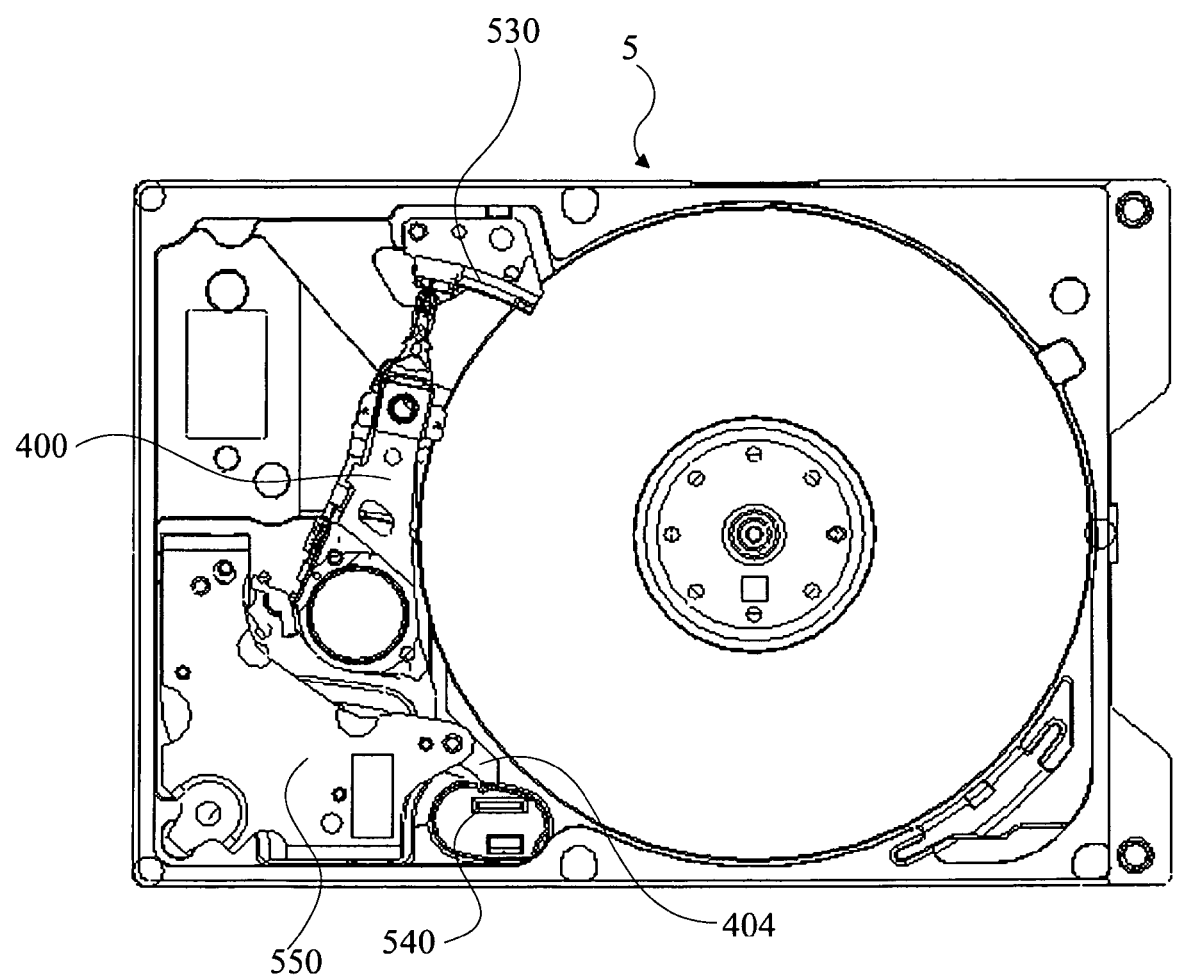
FIG. 12A shows a top plan view of a disk drive after a top voice coil magnet and a latch device is mounted thereon.
Figure 12B:
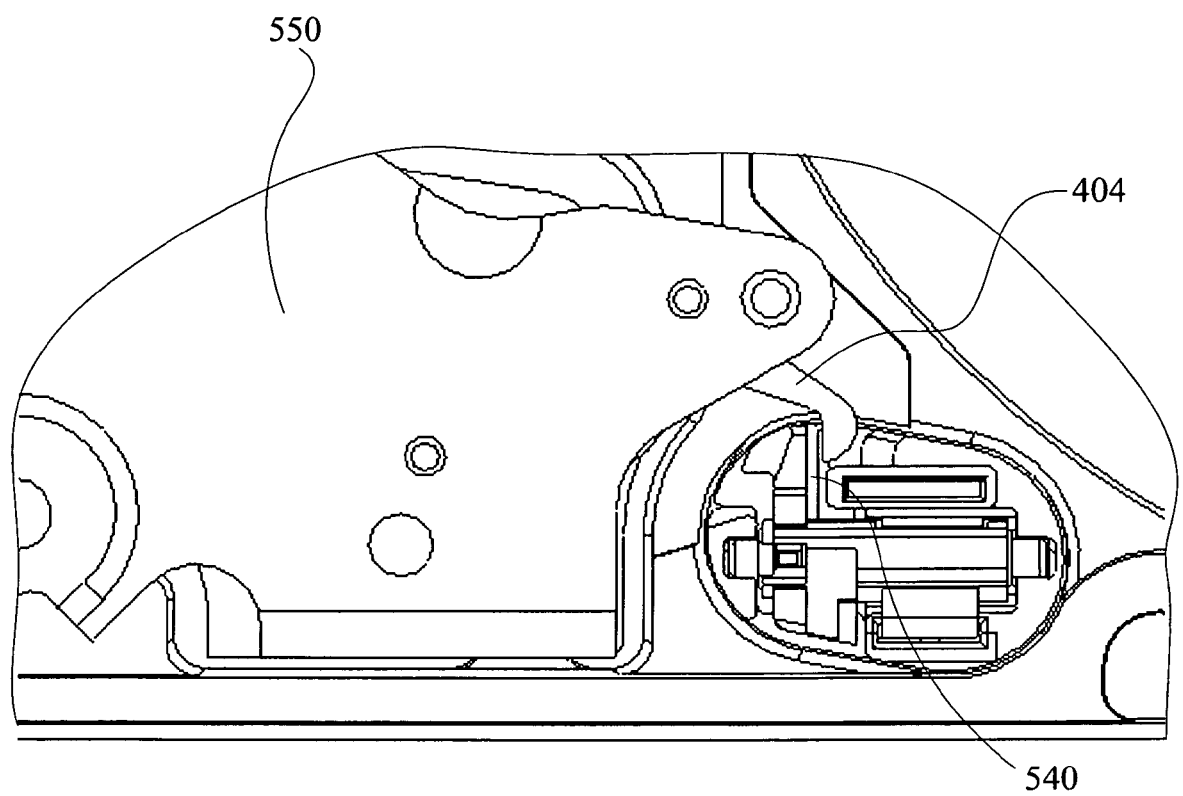
FIG. 12B shows an enlarged, partial view of the disk drive of FIG. 12A illustrating the top voice coil magnet mounted on the disk drive and the latch device being engaged with a latching part of the HSA.

FIGS. 12A-12B show a top plan view of a disk drive 5 after the shipping comb is taken out from the HSA 400 (step S10). As shown, in case where no shipping comb is used to secure the HSA 400 to the ramp 530, the HSA 400 is secured to the ramp 530 by magnetic force generated by a bottom voice coil magnet (not shown) and the top voice coil magnet 550. In addition, the latch device 540 hooks a latch part 404 of the HSA 400, such that the HSA 400 is positioned on the ramp 530 when the disk drive is not in operation.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A method for assembling a disk drive having a ramp, comprising the steps of:
    providing a head stack assembly (HSA) having a plurality of drive arms, each said drive arm having a locating hole therein, and a base cover having a securing hole for mounting the HSA therein;
    providing a shipping comb for assembling the disk drive comprising a comb block; wherein the comb block comprises:
    a locking portion having a comb pin hole forming therein; at least one spacer and a connecting beam to connect the locking portion and the at least one spacer; a comb pin received in the comb pin hole of the locking portion; and a controlling system to engage with and control the comb pin to move in the comb pin hole;
    inserting the comb pin of the shipping comb into the locating holes in the HSA to assemble the shipping comb with the HSA together;
    positioning the assembled HSA and shipping comb on the base cover of the disk drive;
    installing the HSA on the base cover via a bearing device of the HSA;
    rotating the assembled HSA and shipping comb to park the HSA on the ramp and aligning the comb pin with the securing hole;
    pushing the comb pin into the securing hole to lock the HSA in the base cover;
    assembling a latch device and a top voice coil magnet on the base cover;
    rotating the shipping comb to a position where the shipping comb is not interfered with the disk drive; and
    pulling out the shipping comb from the HSA.

2. The method as claimed in claim 1, wherein forming the comb pin comprises forming at least two engaging grooves in the comb pin, and forming the controlling system comprises forming a comb latch selectively engaged with the at least two engaging grooves.

3. The method as claimed in claim 2, wherein forming the comb latch comprises forming a latch member and a first limiter, forming the controlling system further comprises forming a second limiter on the locking portion, and a resilient member, and forming two engaging grooves for selectively engaged with the latch member of the comb latch.

4. The method as claimed in claim 3, wherein forming the locking portion further comprises forming a carrier plate to load the second limiter.

5. The method as claimed in claim 3, wherein forming the comb latch further comprises forming a pair of pivot posts, and forming the locking portion further comprises forming two support plates each of which having a notch to receive the corresponding pivot post.

6. The method as claimed in claim 5, wherein forming the latch member of the comb latch which is contained in a space defined between the two support plates.

7. The method as claimed in claim 3, wherein the resilient member is a spring.

8. The method as claimed in claim 1, wherein forming the comb pin comprises forming a leading portion on a distal end of the comb pin to easily guide the comb pin into the comb pin hole of the locking portion.

* * * * *